US008934871B2

(12) United States Patent
Finkelstein et al.

(10) Patent No.: US 8,934,871 B2
(45) Date of Patent: Jan. 13, 2015

(54) ACCESSING SUBSCRIBED CONTENT WITH A MOBILE COMPUTING DEVICE

(75) Inventors: Jeffrey Finkelstein, San Francisco, CA (US); Richard B. Sagar, San Jose, CA (US); Matthew W. Crowley, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1260 days.

(21) Appl. No.: 11/897,987

(22) Filed: Aug. 31, 2007

(65) Prior Publication Data

US 2009/0061925 A1 Mar. 5, 2009

(51) Int. Cl.
 H04L 12/58 (2006.01)
 H04M 1/725 (2006.01)
 H04W 52/02 (2009.01)

(52) U.S. Cl.
 CPC ...... *H04M 1/72522* (2013.01); *H04W 52/0264* (2013.01); *H04M 2250/64* (2013.01)
 USPC ..................................... 455/412.1; 455/414.1

(58) Field of Classification Search
 USPC ............. 455/412.1–413, 414.1–414.4, 550.1, 455/466, 572–574; 370/311
 See application file for complete search history.

(56) References Cited

U.S. PATENT DOCUMENTS 6,229,990 B1* 5/2001 Toshida ........................... 455/69
7,305,442 B1* 12/2007 Lundy ........................... 709/206
2002/0049858 A1 4/2002 Frietas et al.
2004/0030615 A1* 2/2004 Ling ................................ 705/27
2005/0064852 A1* 3/2005 Baldursson ................ 455/414.2
2005/0245245 A1* 11/2005 Sorvari et al. ................. 455/418
2005/0271021 A1 12/2005 Alemany et al.
2006/0128408 A1* 6/2006 Perttila et al. ................ 455/466
2006/0173965 A1* 8/2006 Yang ............................ 709/206
2006/0190616 A1 8/2006 Mayerhofer et al.
2006/0229114 A2* 10/2006 Kim ........................... 455/575.1
2006/0234762 A1* 10/2006 Ozluturk .................... 455/552.1
2006/0235945 A1 10/2006 Frietas et al.
2007/0077921 A1* 4/2007 Hayashi et al. ............ 455/414.1
2007/0110010 A1 5/2007 Kotola et al.
2007/0118853 A1 5/2007 Kreitzer et al.

(Continued)

FOREIGN PATENT DOCUMENTS

CN     1965245 A     5/2007
WO  WO-2005/122607 A2  12/2005

OTHER PUBLICATIONS

Chinese Office Action, Chinese Application No. 200880112606.7, Apr. 28, 2012, pp. 1-6.

(Continued)

*Primary Examiner* — George Eng
*Assistant Examiner* — Marcus Hammonds
(74) *Attorney, Agent, or Firm* — Fulbright & Jaworski LLP

(57) ABSTRACT

A mobile computing device has a radio frequency transceiver and a processing circuit. The radio frequency transceiver is configured to communicate over a wireless network with a remote server. The processing circuit is configured to receive subscribed content from the remote server. The processing circuit is configured to determine a status of at least one local system resource and to determine whether to proceed with accessing the subscribed content based on the status.

26 Claims, 5 Drawing Sheets

(56) References Cited

U.S. PATENT DOCUMENTS

| | | | |
|---|---|---|---|
| 2007/0171880 A1* | 7/2007 | Ismail | 370/338 |
| 2007/0178911 A1 | 8/2007 | Baumeister et al. | |
| 2007/0204227 A1* | 8/2007 | Kretz | 715/727 |
| 2008/0114855 A1 | 5/2008 | Welingkar et al. | |
| 2008/0115141 A1 | 5/2008 | Welingkar et al. | |
| 2008/0139246 A1* | 6/2008 | Michinaka | 455/557 |

OTHER PUBLICATIONS

Extended European Search Report, European Application No. 08798101.5, May 3, 2012, pp. 1-10.

International Preliminary Report on Patentability, International Application No. PCT/US2008/073483, Mar. 2, 2010, pp. 1-6.

International Search Report and Written Opinion International Application No. PCT/US2008/073483, Nov. 19, 2008, pp. 1-6.

* cited by examiner

ACCESSING SUBSCRIBED CONTENT WITH A MOBILE COMPUTING DEVICE

BACKGROUND

Mobile computing devices, such as mobile telephones, laptop computers, and personal digital assistants, can communicate with different wireless networks in different locations. The same mobile computing device may communicate via a wired network in an office building, a Wi-Fi network at home or at a hotel, and a cellular network while in a moving vehicle. Mobile computing devices may also communicate over a wireless network with a remote server to retrieve content for use on the mobile computing device. The content may be subscribed content, such as a web feed or pod cast.

DETAILED DESCRIPTION OF EXEMPLARY EMBODIMENTS

Described herein are systems and methods which improve the accessing or retrieval of subscribed content which may be delivered via data feeds from a remote server to a mobile computing device. Further described are systems and methods which can intelligently reserve memory space for mobile computing applications when accessing subscribed content from a remote server. Further described are systems and methods for using information regarding wireless networks, including the speed and availability of the wireless networks, to determine when and how to download subscribed content. Further described are systems and methods for transmitting from a server and/or receiving at a mobile computing device subscribed content at a time that minimally interferes with network resources and user operation of the mobile computing device. Further described are systems and methods for timing the receipt of subscribed content from a remote server to minimize the impact on battery power, processor resources, and/or local memory resources. Further described are systems and methods for intelligently determining when, how and/or where to download and save subscribed content on a mobile computing device. Further described are systems and methods for avoiding race conditions. Further described are systems and methods for intelligently automatically downloading subscribed content in order to reduce battery drain, increase data, transfer efficiency, and/or provide adequate storage capabilities for content transferred to a mobile computing device.

The teachings herein extend to those embodiments which fall within the scope of the appended claims, regardless of whether they accomplish one or more of the above-mentioned exemplary advantages.

Figure 1:
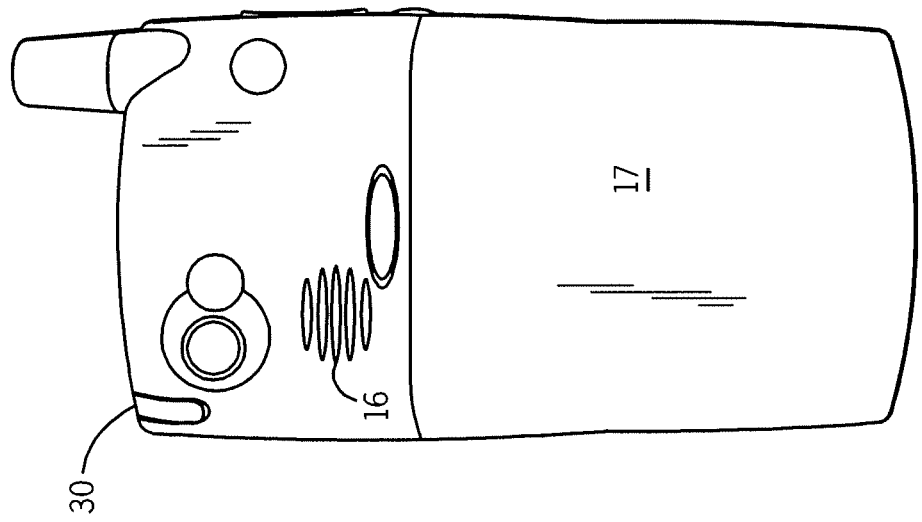
FIG. 1 is a front view of a mobile computing device, according to an exemplary embodiment.

Referring first to FIG. 1, a mobile computing device 100 is shown. Device 100 is a smart phone, which is a combination mobile telephone and handheld computer having personal digital assistant functionality. The teachings herein can be applied to other mobile computing devices (e.g., a laptop computer) or other electronic devices (e.g., a desktop personal computer, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 100 is further configured to receive and operate additional applications provided to device 100 after manufacture, e.g., via wired or wireless download, SecureDigital card, etc.

Figure 2:
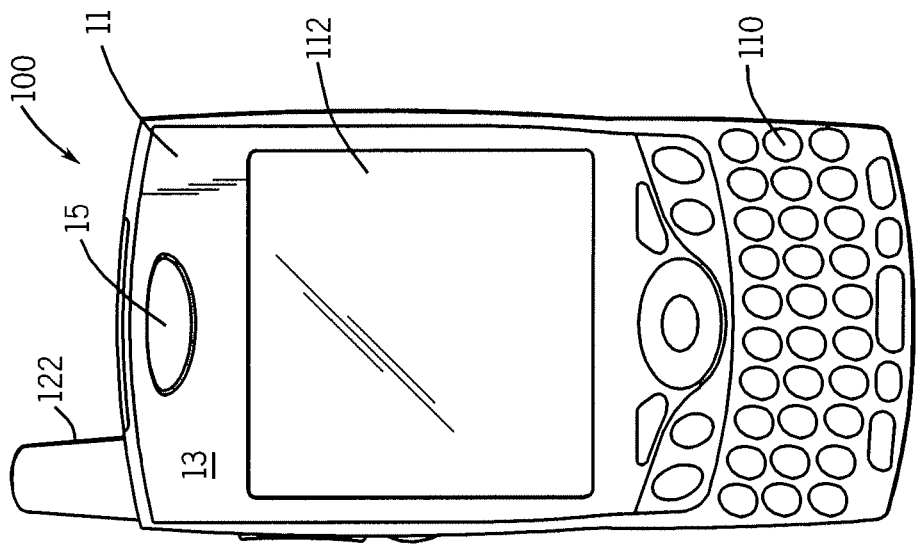
FIG. 2 is a back view of a mobile computing device, according to an exemplary embodiment.

Device 100 comprises a housing 11 having a front side 13 and a back side 17 (FIG. 2). An earpiece speaker 15, a loudspeaker 16 (FIG. 2), and a user input device 110 (e.g., a plurality of keys 110) are coupled to housing 11. Housing 11 is configured to hold a screen in a fixed relationship above a user input device 110 in a substantially parallel or same plane. This fixed relationship excludes a hinged or movable relationship between the screen and plurality of keys in the fixed embodiment. Device 100 may be a handheld computer, which is a computer small enough to be carried in a typical front pocket found in a pair of pants, comprising such devices as typical mobile telephones and personal digital assistants, but excluding typical laptop computers and tablet PCs. In alternative embodiments, display 112, user input device 110, earpiece 15 and loudspeaker 16 may each be positioned anywhere on front side 13, back side 17, or the edges therebetween.

In various embodiments device 100 has a width (shorter dimension) of no more than about 200 mm or no more than about 100 mm. According to some of these embodiments, housing 11 has a width of no more than about 85 mm or no more than about 65 mm. According to some embodiments, housing 11 has a width of at least about 30 mm or at least about 50 mm. According to some of these embodiments, housing 11 has a width of at least about 55 mm.

In some embodiments, housing 11 has a length (longer dimension) of no more than about 200 mm or no more than about 150 mm. According to some of these embodiments, housing 11 has a length of no more than about 135 mm or no more than about 125 mm. According to some embodiments, housing 11 has a length of at least about 70 mm or at least about 100 mm. According to some of these embodiments, housing 11 has a length of at least about 110 mm.

In some embodiments, housing 11 has a thickness (smallest dimension) of no more than about 150 mm or no more than about 50 mm. According to some of these embodiments, housing 11 has a thickness of no more than about 30 mm or no more than about 25 mm. According to some embodiments, housing 11 has a thickness of at least about 10 mm or at least about 15 mm. According to some of these embodiments, housing 11 has a thickness of at least about 50 mm.

In some embodiments, housing 11 has a volume of up to about 2500 cubic centimeters and/or up to about 1500 cubic centimeters. In some of these embodiments, housing 11 has a volume of up to about 1000 cubic centimeters and/or up to about 600 cubic centimeters.

While described with regards to a handheld device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, etc.

Device 100 may be configured to provide voice and/or data communications functionality through wireless access points (WAPs) in accordance with different types of wireless network systems. A wireless access point may comprise any one or more components of a wireless site used by device 100 to create a wireless network system that connects to a wired infrastructure, such as a wireless transceiver, cell tower, base station, router, cables, servers, or other components depending on the system architecture. Examples of wireless network systems may further include a wireless local area network (WLAN) system, wireless metropolitan area network (WMAN) system, wireless wide area network (WWAN) system (e.g., a cellular network), and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network (PAN) system, such as a Bluetooth® system operating in accordance with the Bluetooth Special Interest Group (SIG) series of protocols.

Figure 3:
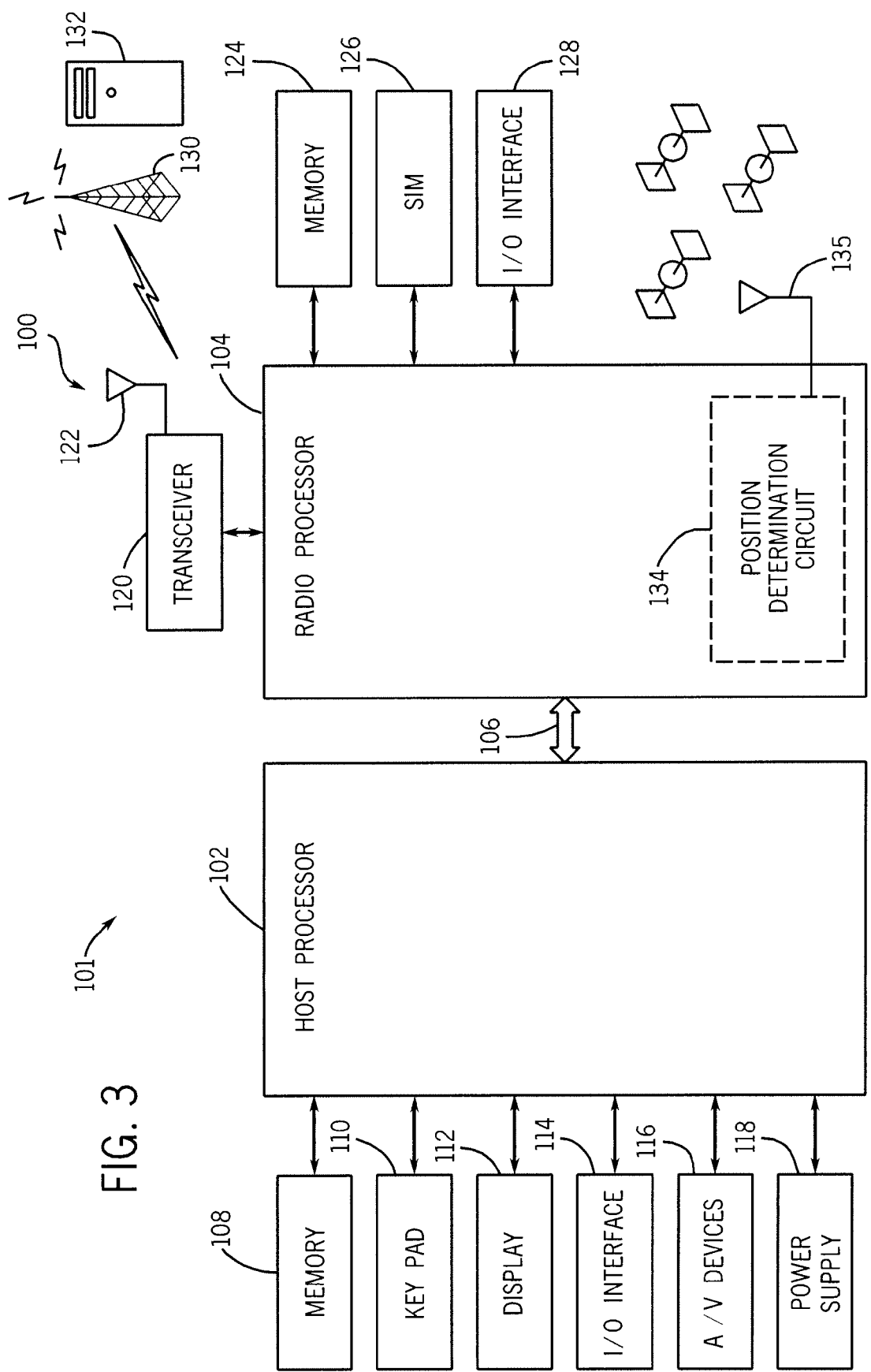
FIG. 3 is a block diagram of the mobile computing device of FIGS. 1 and 2, according to an exemplary embodiment.

As shown in the embodiment of FIG. 3, device 100 may comprise a processing circuit 101 which may comprise a dual processor architecture, including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 100. The radio processor 104 may be responsible for performing various voice and data communications operations for device 100 such as transmitting and receiving voice and data information over one or more wireless communications channels. Although embodiments of the dual processor architecture may be described as comprising the host processor 102 and the radio processor 104 for purposes of illustration, the dual processor architecture of device 100 may comprise one processor, more than two processors, may be implemented as a dual- or multi-core chip with both host processor 102 and radio processor 104 on a single chip, etc. Alternatively, processing circuit 101 may comprise any digital and/or analog circuit elements, comprising discrete and/or solid state components, suitable for use with the embodiments disclosed herein.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments.

The host processor 102 may be configured to provide processing or computing resources to device 100. For example, the host processor 102 may be responsible for executing various software programs such as application programs and system programs to provide computing and processing operations for device 100. Examples of application programs may include, for example, a telephone application, voicemail application, e-mail application, instant message (IM) application, short message service (SMS) application, multimedia message service (MMS) application, web browser application, personal information manager (PIM) application (e.g., contact management application, calendar application, scheduling application, task management application, web site favorites or bookmarks, notes application, etc.), word processing application, spreadsheet application, database application, video player application, audio player application, multimedia player application, digital camera application, video camera application, media management application, a gaming application, and so forth. The application software may provide a graphical user interface (GUI) to communicate information between device 100 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 100 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EE- PROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 100 may comprise an memory port or expansion slot 123 (FIG. 1) to support a multimedia and/or memory card, for example. Processing circuit 101 may use memory port 123 to read and/or write to a removable memory card having memory, for example, to determine whether a memory card is present in port 123, to determine an amount of available memory on the memory card, to store subscribed content or other data or files on the memory card, etc.

Device 100 may comprise a user input device 110 coupled to the host processor 102. The user input device 110 may comprise, for example, a alphanumeric, numeric or QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad and so forth.

The host processor 102 may be coupled to a display 112. The display 112 may comprise any suitable visual interface for displaying content to a user of device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 100 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 100 may be configured to transfer and/or synchronize information with the local computer system.

The host processor 102 may be coupled to various audio/video (A/V) devices 116 that support A/V capability of device 100. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 100. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

Device 100 may comprise a transceiver 120 coupled to the radio processor 104. The transceiver 120 may comprise one or more transceivers configured to communicate using different types of protocols, communication ranges, operating power requirements, RF sub-bands, information types (e.g., voice or data), use scenarios, applications, and so forth. For example, transceiver 120 may comprise a Wi-Fi transceiver and a cellular or WAN transceiver configured to operate simultaneously.

The transceiver 120 may be implemented using one or more chips as desired for a given implementation. Although the transceiver 120 may be shown as being separate from and external to the radio processor 104 for purposes of illustration, in various embodiments some portion or the entire transceiver 120 may be included on the same integrated circuit as the radio processor 104.

Device 100 may comprise an antenna system 122 for transmitting and/or receiving electrical signals. As shown, the antenna system 122 may be coupled to the radio processor 104 through the transceiver 120. The antenna system 122 may comprise or be implemented as one or more internal antennas and/or external antennas.

Device 100 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104. Further, host proceesor 102 and radio processor 104 may share a single memory.

Device 100 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 100 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more position determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

In various embodiments, device 100 may comprise dedicated hardware circuits or structures, or a combination of dedicated hardware and associated software, to support position determination. For example, the transceiver 120 and the antenna system 122 may comprise GPS receiver or transceiver hardware and one or more associated antennas coupled to the radio processor 104 to support position determination.

The host processor 102 may comprise and/or implement at least one LBS (location-based service) application. In general, the LBS application may comprise any type of client application executed by the host processor 102, such as a GPS application, configured to communicate position requests (e.g., requests for position fixes) and position responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

Radio processor 104 may be configured to invoke a position fix by configuring a position engine and requesting a position fix. For example, a position engine interface on radio processor 104 may set configuration parameters that control the position determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service (QoS) values, optimization parameters (e.g., optimized for speed, accuracy, or payload), PDE address (e.g., IP address and port number of LPS or MPC), etc. In one embodiment, the position engine may be implemented as a QUALCOMM® gpsOne® engine.

Figure 4:
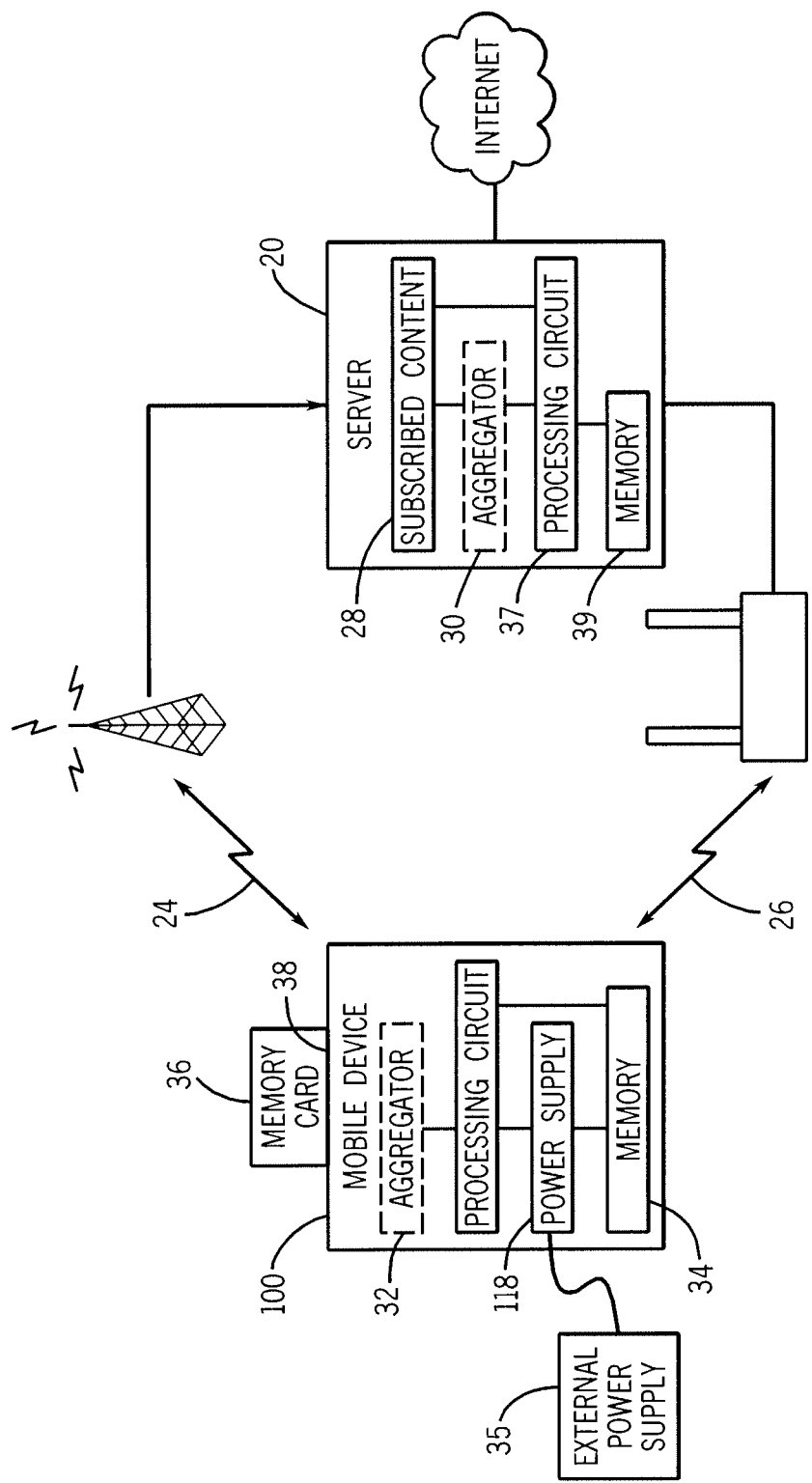
FIG. 4 is a block diagram of a system and method of accessing subscribed content with a mobile computing device, according to an exemplary embodiment.

With reference now to FIG. 4, mobile computing device 100 may be used to access subscribed content on a remote server 20 via a wireless network 24, 26. Subscribed content is data published by a content provider to which a user has subscribed or may subscribe in order to receive updated content. Subscribed content 28 includes web casts (e.g., podcasts such as video, audio, and still photo data), data provided in a web feed format, such as RSS (Really Simple Syndication), RDF (Resource Description Framework), OPML (Outline Processor Markup Language), the Atom Syndication Format or other markup language formats, such as hypertext markup language (HTML) or extensive markup language (XML). Subscribed content may include news feeds, blogs, school information, podcasts, cached web pages, etc., and may include enclosures in an enclosed file format or other code pointing to media files (e.g., audio, video, photo, etc.). Subscribed content or updated subscribed content may be referred to as episodes, publications, volumes, numbers, editions, etc. Subscribed content may be described as being "pulled" from a content source using an aggregator or other mechanism as described below, as opposed to being "pushed" as with e-mail and instant messaging, though in alternative embodiments subscribed content, too, may be pushed, for example to an internet aggregator. Subscribed content does not include conventional e-mails in this embodiment, though in alternative embodiments, the teachings herein may be applied to e-mails and other content which is not subscribed content. Subscribed content may be updated periodically or from time to time by the associated content provider or a third party. Subscribing to a web feed or other source of subscribed content may be accomplished by a user registering or subscribing with a content provider, for example via the content providers web site, which may in one embodiment comprise dragging a link from a web browser to an aggregator, or clicking an icon (e.g., an RSS icon), etc.

An aggregator 30, 32 (or feed reader, news reader, etc.) is an application or other module which collects web feeds or other subscribed content to make the subscribed content more easily accessible to a user. One exemplary aggregator is Bloglines, a division of Ask.com, produced by IAC Search & Media, Oakland, Calif. Aggregator 30, 32 may be operable on one or both of mobile device 100 and server 20. Aggregator 30, 32 may be configured to query all servers in a user's preselected list of web feeds or subscribed content sources (e.g., feed list) to check for new subscribed content. The checking may occur periodically (e.g., every 30 minutes, once a day, etc.) or from time to time and preferably occurs on a predetermined period or time schedule. If new content exists, aggregator 30, 32 may make a note of the new content, for example by setting a flag or downloading a new web feed summary or link, or aggregator 30, 32 may download or synchronize with part or all of the subscribed content or a summary of the subscribed content.

Mobile computing device 100 is configured to access subscribed content 28 via a wireless WAN 24, wireless LAN 26, and or other wired or wireless networks. Subscribed content 28 may be accessed by streaming content from server 20 to device 100, which is the presentation of the content to the user while the data is downloading, typically with a portion of the content stored or cached on device 100. Subscribed content 28 may alternatively be accessed by downloading content from server 20 to device 100, which is the reception and storage of the subscribed content on device 100. In either case of streaming or downloading, resources of device 100, such as one or more of battery power, memory space, processing bandwidth and wireless network bandwidth, are used.

Figure 5:
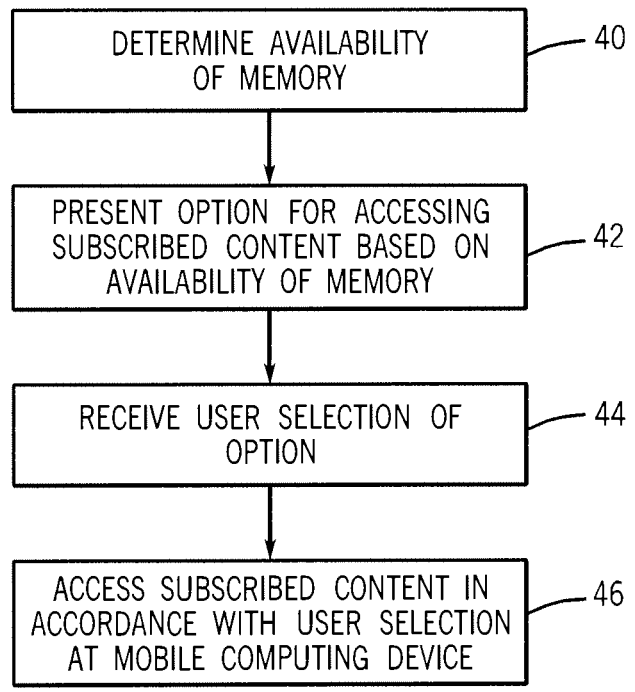
FIG. 5 is a flowchart illustrating a system and method of accessing subscribed content with a mobile computing device, according to an exemplary embodiment.

Referring now to FIG. 5, a system and method for accessing subscribed content with a mobile computing device will be described. Processing circuit 101 may be configured to run an application configured to provide an interface to the user via display 112. The interface may be a web browser, internet aggregator, or other user interface configured to present to the user a plurality of subscribed content sources, such as web sites, web feeds, etc. The subscribed content sources may be collected in a media guide application operable on server 20, or device 100 may be configured to allow the user to browse to different web pages on the internet to select subscribed content sources. The interface is configured to receive user selection of a plurality of subscribed content sources and to store them in a database on device 100 or server 20.

At step 40, processing circuit 101 is configured to determine an availability of a memory 34, 36, which may be any of the types of memory discussed above with reference to memories 108, 124. Memory 34 may be internal to device 100 or a memory card 36. A memory port 38 may be configured to receive removable memory card 36. Step 40 may comprise determining whether the removable memory card is present in the memory port to determine the availability of memory. Alternatively, step 40 may comprise determining whether a predetermined amount of memory is free and usable (e.g., not allocated to other applications or system programs) on memory 34 or memory card 36 to determine the availability of memory. Processing circuit 101 may be configured to calculate the predetermined amount of memory based on size data about subscribed content 28 to be accessed from remote server 20. Alternatively, the predetermined amount of memory may be a user-selectable value or a value stored in memory 34 by a manufacturer, service provider, or enterprise technician.

At step 42, processing circuit 101 is configured to present to the user via display and/or audible output an option for accessing the subscribed content which is based on the availability of the memory. The option may be presented before, during, or subsequent to the user selecting subscribed content sources and/or reconfiguring subscribed content settings (e.g., frequency of checking for new content, frequency of downloading new content to device 100, etc.). In one example, if processing circuit 101 determines a memory card is present and/or that a sufficient amount of memory is available on memory card 36, processing circuit 101 is configured to present to the user the options of streaming, downloading or subscribing to the subscribed content with respect to one or more (or all) of the subscriptions. The user may then select from among the options, wherein the selection is stored in memory 34 or on server 20. In another example, if processing circuit 101 determines the absence of memory card 36 or that insufficient memory is available on memory card 36 and/or memory 34, the user is only presented with the stream option, or is presented with a set of options not including a download option. In another embodiment, the user may be presented with the stream option by indicating to the user that the selected subscribed content will be streamed, whereby user selection is not required to confirm the stream option. Other options for accessing subscribed content may be presented to the user, some or all of which may be selectively disclosed based on memory availability, such as, a trickle download (e.g., a download at significantly slower than a maximum download time capability of a wireless network).

At step 44, processing circuit 101 is configured to receive a user selection of one or more of the presented options. Processing circuit 101 may then be configured to execute the user instructions and/or forward the user instructions to server 20 for execution. For example, if a user selects a subscribe option when a source of subscribed content is selected, processing circuit 101 is configured to add the subscribed content to a local or remote database of subscriptions. If a user selects a download option when a source of subscribed content is selected, a latest subscribed content may be downloaded in response to the command, and/or the subscribed content may be marked to download during the next publication of updated subscribed content (or the next time aggregator 30, 32 collects updated subscribed content). If a user selects a streaming option when a source of subscribed content is selected, a latest subscribed content may be streamed in response to the command, and/or the subscribed content may be marked to stream during the next publication of updated subscribed content (or the next time aggregator 30, 32 collects updated subscribed content). At step 46, processing circuit 101 is configured to access the subscribed content at device 100 in accordance with the user selection of the option or options.

Scheduling of aggregation and delivery to device 100 may occur in a number of ways. In one example, aggregator 30 is operable on server 20, which has the resources (e.g., processing power, power supply, etc.) to frequently check sources of subscribed content for updated content or recent publications (e.g., every 30 seconds, 10 seconds, several minutes, etc.). Device 100 may send a message to aggregator 30 indicating when aggregator 30 should check for updates, for example upon receipt of the message (which may be automatically generated or generated in response to a user request), periodically and without further command from device 100, etc. Aggregator 30 may then transmit the updated subscribed content to device 100 in any of a number of ways. For example, aggregator 30 may immediately transmit updated subscribed content to device 100. This transmission may be done according to a preselected delivery option (e.g., download or stream). Alternatively, aggregator 30 may immediately send a message to device 100 which prompts the user to select whether to receive content now or defer receipt until a later time. Device 100 may further prompt the user to select a delivery option (e.g., download or stream). Alternatively, processing circuit 101 may at this time determine the availability of memory and present to the user an option based on the availability of memory, as described hereinabove. Thus, the step of presenting an option based on the availability of memory may occur during a user-initiated session to select, edit or review subscribed content and/or may occur during a server-initiated session which is initiated in response to the receipt of updated subscribed content, periodically, from time to time, etc. In another alternative, aggregator 32 may be configured to only transmit content to device 100 periodically, only when predetermined search criteria are met within updated subscribed content, only during a predetermined time (e.g., a time of day), or only in response to an approval-to-send message from device 100 (e.g., in embodiments in which device 100 may be configured to check the availability or use of local resources, as described below with reference to FIG. 8). In another example, aggregator 32 may be operable on processing circuit 101 which checks subscribed content sources for updated content periodically, from time to time, etc., though this embodiment uses more power, processing, and network resources on device 100 than the embodiment in which aggregator 30 is operable on server 20. Further, either of aggregator 30 or 32 may be configured to receive keywords or tags that aggregator 30, 32 uses to search within subscribed content and, in response to a hit, presents an audible and/or visible alarm to the user to indicate new subscribed content meeting a keyword criteria has been identified.

It is understood that one or more of the steps described herein may be performed by server 20 and/or shared between device 100 and server 20 in various alternate embodiments.

Figure 6:
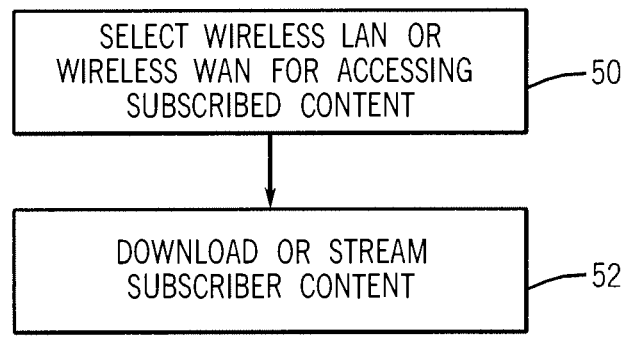
FIG. 6 is a flowchart illustrating a system and method of accessing subscribed content with a mobile computing device, according to an exemplary embodiment.

Referring now to FIG. 6, a system and method of accessing subscribed content with a mobile computing device is described, according to an exemplary embodiment. At step 50, processing circuit 101 is configured to select one of a wireless WAN 24 and a wireless LAN 26 for accessing subscribed content (e.g., via download, stream, etc.). In alternative embodiments, processing circuit 101 may be configured to select from any other wireless network or networks available and/or compatible with device 100. At step 52, processing circuit 101 is configured to download or stream subscribed content using the selected wireless network. The downloading may occur in a first mode of operation and the streaming may occur in a second, different mode of operation. For example, if memory 34, 36 is unavailable, processing circuit 101 may be configured to operate in the second mode of operation to stream data. If at a later time memory card 36 is inserted, processing circuit 101 may switch to operate in the first mode of operation to download data. As a second example, processing circuit 101 may operate in the first or second mode based on user selection. Modes may be also be determined based on the application being run, or based on other criteria.

In one exemplary embodiment, in response to a user selection to stream subscribed content from remote server 20, processing circuit 101 may be configured to select wireless LAN 26 for communication, because wireless LANs typically operate at higher communication speeds than other wireless networks.

In another exemplary embodiment, processing circuit 101 is configured to communicate over wireless LAN 26 with remote server 20 to receive subscribed content and, if wireless LAN 26 is or becomes unavailable, processing circuit 101 is configured to switch to communicating over wireless WAN 28 with remote server 20.

In another exemplary embodiment, processing circuit 101 is configured to select the wireless network for communication with the remote server based on communication speed data stored in memory for both of the wireless networks. The communication speed data may be prestored during manufacture or by a user or from a previous communication session with the wireless network, or may be measured or received from the wireless network at the time of selecting a wireless network. Alternatively, or in addition, price, signal strength, hours of operation, and/or other network characteristics may be used by processing circuit 101 to select a wireless network.

In another exemplary embodiment, processing circuit 101 is configured to present indicia on display 112 of an option to download the subscribed content and an option to stream the subscribed content, to receive a user selection of one of the stream option and the download option, and to store the user selection. The indicia may be a dialog box, an icon, a button to be clicked by a mouse, or other graphical or visible indicia. The user selection may be stored on device 100 or server 20 and may be associated with one or more subscriber content sources. Step 52 may then be executed to carry out the user selection.

One or more steps of the embodiments of FIGS. 4-8 may be combined with or added to other steps in FIGS. 4-8 to provide further embodiments. For example, if memory card 36 is not present in device 100, device 100 presents only the stream option. In response to a user selection of the stream option to stream subscribed content, device 100 selects without user input a fastest available data access type or wireless network (e.g., Wi-Fi if available, then carrier network).

Figure 7:
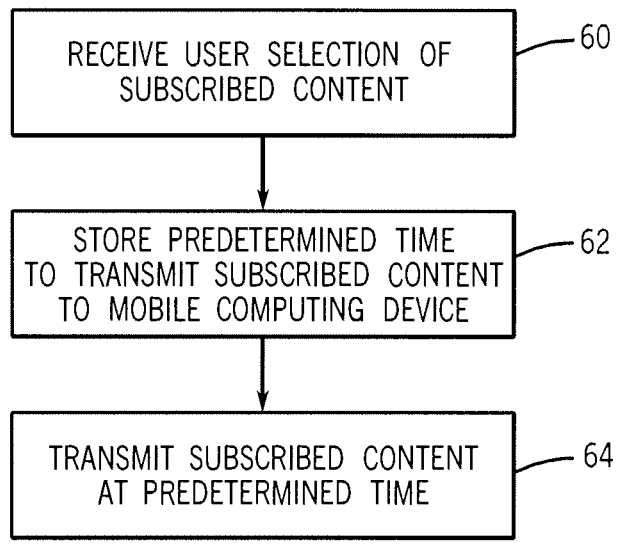
FIG. 7 is a flowchart illustrating a system and method of accessing subscribed content with a mobile computing device, according to an exemplary embodiment.

Referring now to FIG. 7, a system and method for accessing subscribed content with a mobile computing device will be described. At step 60, server 20 is configured to receive a user selection of subscribed content via a data output terminal configured to communicate with device 100 over wireless network 24 and/or 26. The data output terminal may be any port or connection coupled to server 20 and configured to allow server 20 to communicate wirelessly or via wire with a wireless access point, whether directly or indirectly, and/or to the Internet. At step 62, a processing circuit 37 coupled to server 20 may be configured to store in a memory 39 a predetermined time to transmit subscribed content 28. At step 64, processing circuit 37 may further be configured to transmit the subscribed content to device 100 at the predetermined time. Alternatively, device 100 may be configured to store the predetermined time and to transmit a request to server 20 at the predetermined time for access to updated subscribed content.

The predetermined time may be selected by the user of device 100 or via a web portal directly to server 20. For example, a user may configure device 100 and/or server 20 to only provide updated subscribed content to device 100 between the hours of 1 AM and 5 AM, which would avoid the transmission of data interfering with the user's operation of device 100. The predetermined time may represent a time of day, and may be done with reference to peak, off-peak, or other time periods defined by a carrier of wireless WAN 24. The predetermined time may represent a predetermined period of time (e.g., every 30 minutes, every 1 hour, every 1 day, etc).

The predetermined time may be delayed by user request to device 100, which is subsequently communicated to server 20, or without user input by device 100 detecting a status of a local system resource (as shown below in exemplary form with reference to FIG. 8) and determining based on the status that synchronization or access of updated subscribed content should be delayed.

As mentioned above, steps of FIG. 7 may be combined with steps of others of the Figs. For example, if device 100 has memory card 36 available and the user chooses to subscribe to a podcast, the user may determine the time of day they want device 100 to synchronize with server 20 to receive any updated subscribed content. When the synchronization time arrives, device 100 will attempt to download or stream the updates over a Wi-Fi network first and then via a carrier network.

According to one exemplary embodiment, processing circuit 37 may be configured to detect whether the mobile computing device is in an inactive state, and to transmit the subscribed content to the mobile computing device based on the determination of whether the mobile computing device is in an inactive state. A determination of an inactive state may be made by device 100 and/or server 20, either alone or using processing resources and/or data from both device 100 and server 20. Server 20 may detect the inactive state independently or by receiving a signal from device 100 indicating device 100 is in an inactive state. In one example, processing circuit 37 may be configured to determine that device 100 is in an inactive state at approximately a time when the processing circuit has completed a data synchronization process (e.g., e-mail, contacts, other personal information, etc.) with the mobile computing device. Processing circuit 37 may further be configured to transmit the subscribed content after the data synchronization during a single communication session (e.g., without ending a communication session established for the data synchronization). In another example, processing circuit 37 may be configured to determine that the mobile computing device is in an inactive state based on a signal from the mobile computing device indicating the absence of user input to device 100 for a predetermined period of time. In other examples, an inactive state of device 100 may be defined by an absence of a particular application running, or particular applications or a type of application running, the absence of a communication session between device 100 and one or more wireless networks, whether the display of the device is actively displaying information, whether the device is "powered on", or other activity or presence indicators.

The steps set forth in FIGS. 5-8 may be performed in any order and are not limited to the order in which they are presented. For example, in FIG. 7, step 62 of storing a predetermined time may occur during a setup operation long before step 60 of receiving a user selection of subscribed content. Alternatively, both can occur during the same communication session and in any order.

Figure 8:
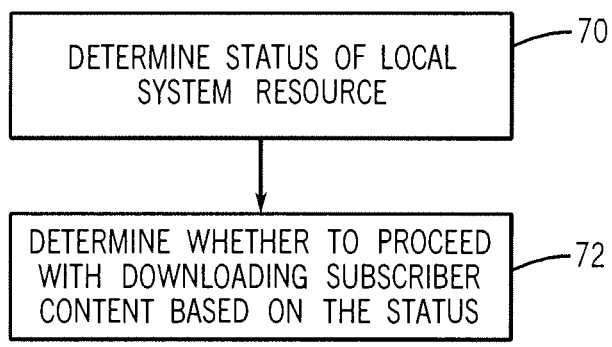
FIG. 8 is a flowchart illustrating a system and method of accessing subscribed content with a mobile computing device, according to an exemplary embodiment.

Referring now to FIG. 8, a system and method for accessing subscribed content with a mobile computing device will be described. At step 70, processing circuit 101 is configured to determine a status of at least one local system resource and, at step 72, to determine whether to proceed with accessing subscribed content based on the status. A local system resource may be a module, component, or sub-unit of device 100, such as power supply 118, a processor, radio frequency transceiver 120, memory 34, 36, or other resources operable while at least a portion of device 100 is in an ON state.

A status of the resource may be a characteristic which can change during different modes of operation of device 100. For example, a status of power supply 118 may indicate whether the power supply is coupled to an external power source 35 (e.g., a wall outlet, external battery pack, car charger, etc.), wherein processing circuit 101 is configured to determine not to proceed with the accessing of the subscribed content if the power supply is not coupled to an external power source.

In another example, a status of a processor may indicate the operation of an application in use by the user, wherein processing circuit 101 is configured to determine not to proceed with the accessing of the subscribed content if the application is in use by the user. An application may be in use by a user, for example, during a telephone call using a telephony application, synchronizing-mail in an e-mail application, browsing web sites with a web browser application, playing a game with a gaming application, etc. In some uses of applications, radio frequency transceiver 120 is used for wireless communication and use of said applications or active use of radio frequency transceiver 120 may be provided as an indicia of status. According to one exemplary embodiment, if device 100 is in use at the time of a recurring download of updated subscribed content, rather than share processor and/or wireless network bandwidth with the user, the recurring download may be delayed until full available bandwidth and system resources are available.

In another example, a status of radio frequency transceiver 120 may indicate the availability of a predetermined wireless network operating at a higher speed than another predetermined wireless network, wherein processing circuit 101 is configured to determine not to proceed with the accessing of the subscribed content if the higher speed wireless network is not available.

In another example, a status of memory 34, 36 may indicate whether a predetermined amount of memory allocated for downloads is available, wherein processing circuit 101 is configured to determine not to proceed with the accessing of the subscribed content if the predetermined amount of memory allocated for downloads is not available. For example, a download application operable on processing circuit 101 may be configured by default to not download subscribed content if memory 34 or 36 has less than 10 percent (or another predetermined percentage, which may be user-adjustable) of available memory on memory card 36.

The determination not to proceed with accessing subscribed content may in some embodiments comprise not scanning for or aggregating updated content during a scheduled time to scan for or aggregate data. The determination not to proceed with accessing subscribed content may occur before or during a download or stream of subscribed content.

According to an advantage of some embodiments, a podcast may be a file between 50 megabytes and 100 megabytes, the downloading of which would consume significant battery power, memory, processing bandwidth, and wireless network bandwidth. Various embodiments described herein may help conserve such resources when they are needed, while still accomplishing the access of subscribed data for the user.

According to some embodiments, criteria for determining how and when to download subscriber content may be programmed into device 100 and/or server 20 by a cellular network carrier, and may differ from one carrier's network to another. Carriers may use one or more of these methods to reduce network traffic during hours of peak usage and move network traffic to off-peak hours.

According to another embodiment, processing circuit 101 may be configured to delay downloading subscriber content until a faster wireless network is available. For example, if processing circuit 101 determines that no Wi-Fi network or other wireless LAN is available, rather than switch to downloading via wireless WAN, processing circuit 101 may be configured to continuously monitor for the presence of a Wi-Fi network and, upon detecting the presence of a Wi-Fi network, attempt to communicate to server 20 via the detected Wi-Fi network.

According to another exemplary embodiment, device 100 and/or server 20 may be configured to determine the number of episodes of subscribed content the user wishes to download based on one or more criteria, such as a user-selectable preference or default based on type of subscribed content (e.g., video feed, audio feed, photograph feed, etc.). For example, for a large podcast, such as a weekly news show, device 100 and/or server 20 may be configured to download only a most recent episode, whereas for other subscribed content, such as digital still photo feeds, device 100 and/or server 20 may be configured to download all new photos (e.g., all photos not previously downloaded, all photos published within a predetermined time period (e.g., within the past week, month, year, etc.), etc.). Advantageously, because digital still photo feeds typically use less memory or have a smaller file size, device 100 may have sufficient memory to download more than just the most recent episode and a user likely wishes to view more than just the most recent episode.

According to another embodiment, processing circuit 101 may be configured to delay downloading subscriber content if power supply 118 is below a predetermined amount of available power (e.g., less than a predetermined percentage of battery power). Processing circuit 101 may further be configured to calculate an estimated amount of power required to download a web feed based on the size of the web feed, the speed of the wireless network to be used, and/or the power consumption of the wireless network to be used. If the estimated amount of power is greater than or within a threshold of the amount of power remaining in power supply 118, processing circuit 101 may be configured to delay downloading updated subscriber content. The predetermined amount of available power may be user-selectable or configured by a carrier service professional or enterprise technician.

With reference to the disclosure and claims, use of the phrase "based on" means "based at least in part on," and use of the term "a," "an" or "one" means "one or more" or "at least one." Further, any of the steps of any of the methods disclosed herein may be combined with any of the other steps and/or rearranged with other steps in alternative embodiments. Specifically, various embodiments may make use of different combinations of parts or all of the methods disclosed herein.

While the exemplary embodiments illustrated in the Figs., and described above are presently exemplary, it should be understood that these embodiments are offered by way of example only. Accordingly, the present invention is not limited to a particular embodiment, but extends to various modifications that nevertheless fall within the scope of the appended claims.

What is claimed is:

1. A mobile computing device, comprising:
   a radio frequency transceiver to communicate over a wireless network with a remote server;
   a memory;
   a memory port to receive a removable memory card;
   a display; and
   a processing circuit to:
      receive, from a user of the mobile computer device, a selection of subscribed content to be received from the remote server,
      determine an availability of the memory by determining whether a predetermined amount of memory is free, wherein the predetermined amount of memory is a user-selectable value,
      in response to the selection of the subscribed content, present to the user one or more available options for accessing the subscribed content, wherein the one or more available options for accessing the subscribed content are based on the availability of the memory,
      receive a user selection from the one or more options presented, and
      access the subscribed content based on the user selection.

2. The mobile computing device of claim 1, the removable memory card comprising the memory.

3. The mobile computing device of claim 2, the availability of the memory comprising whether the removable memory card is present in the memory port.

4. The mobile computing device of claim 1, when the predetermined amount of memory is not free, the option presented to the user comprising an option to stream the content.

5. The mobile computing device of claim 1, the option is one of a set of options for accessing the subscribed content, the processing circuit to present a stream option and a download option when the memory is available.

6. The mobile computing device of claim 5, the set of options does not comprise a download option if the memory is not available.

7. The mobile computing device of claim 1, the option for accessing the subscribed content comprising a subscribe option.

8. The mobile computing device of claim 1, the processing circuit further to:
   set the mobile computing device in a download mode or stream mode in response to the user selection,
   determine when the removable memory card becomes present or is no longer present in the memory port,
   switch to the stream mode when the removable memory card is no longer present and the mobile computing device is in the download mode, and
   switch to the download mode when the removable memory card becomes present and the mobile computing device is in the stream mode.

9. The mobile computing device of claim 1, the processing circuit to:
   determine whether the mobile computing device is in an inactive state, and
   delay access of the subscribed content when a power supply of the mobile computing device is not connected to an external power source, the mobile computing device is not connected to a local wireless network, and the mobile computing device is not in the inactive state.

10. A method of receiving content from a remote server at a mobile computing device, comprising:
    receiving, from a user of the mobile computer device, a selection of subscribed content to be received by the mobile computing device from the remote server;
    determining an availability of a memory of the mobile computing device by determining whether a predetermined amount of memory is free, wherein the predetermined amount of memory is a user-selectable value;
    in response to receiving the selection of the subscribed content, presenting, on the mobile computing device, one or more available options for accessing subscribed content published by a content provider with which a user of the mobile computing device has a subscription to receive updated subscribed content, wherein the one or more available options for accessing the subscribed content are based on the availability of the memory;
    receiving a user selection from the one or more options; and
    accessing the subscribed content based on the user selection from the one or more options.

11. The method of claim 10, wherein a removable memory card at the mobile computing device comprising the memory.

12. The method of claim 11, determining the availability of the memory comprising determining whether the removable memory card is present in the memory port.

13. The method of claim 10, when the predetermined amount of memory is not free, the option presented to the user comprising an option to stream the content.

14. The method of claim 10, the option is one of a set of options for accessing the subscribed content, presenting an option for accessing the subscribed content comprising presenting a stream option and a download option if the memory is available.

15. The method of claim 14, the set of options does not comprise a download option if the memory is not available.

16. The method of claim 10, the option of accessing the subscribed content comprising a subscribe option.

17. The method of claim 10, further comprising:
    setting the mobile computing device in a download mode or stream mode in response to the user selection;
    determining when a removable memory card becomes present or is no longer present at the mobile device;
    switching to the stream mode when the removable memory card is no longer present and the mobile computing device is in the download mode;
    switching to the download mode when the removable memory card becomes present and the mobile computing device is in the stream mode;
    determining whether a power supply of the mobile computing device is connected to an external power source;
    determining whether the mobile computing device is in an inactive state;
    accessing the subscribed content on the mobile computing device based on the user selection when the power supply of the mobile computing device is connected to the external power source, the mobile computing device is connected to a local wireless network and the mobile computing device is in the inactive state, wherein the subscribed content is accessed from the remote server via the local wireless network; and
    delaying access of the subscribed content when the power supply of the mobile computing device is not connected to the external power source, the mobile computing device is not connected to the local wireless network, and the mobile computing device is not in the inactive state.

18. The method of claim 10, further comprising:
storing the user selection in the memory; and
accessing updated subscribed content published after receiving the user selection based on the stored user selection.

19. A mobile computing device, comprising:
a radio frequency transceiver to communicate over a wireless network with a remote server:
a memory;
a display; and
a processing circuit to:
  receive, from a user of the mobile computer device, a selection of subscribed content to be received from the remote server, wherein the subscribed content is published by a content provider with which the user of the mobile computing device has a subscription to receive updated subscribed content,
  determine an availability of the memory by determining whether a predetermined amount of memory is free, wherein the predetermined amount of memory is a user-selectable value,
  in response to the selection of the subscribed content, present to the user one or more available options for accessing the subscribed content based on the availability of the memory,
  receive a user selection from the presented one or more options,
  store the user selection in the memory,
  set the mobile computing device in a download mode or a stream mode in response to the user selection,
  determine when a removable memory card becomes present or is no longer present at the mobile computing device,
  switch to the stream mode when the removable memory card is no longer present and the mobile computing device is in the download mode,
  switch to the download mode when the removable memory card becomes present when the mobile computing device is in the stream mode,
  determine whether a power supply of the mobile computing device is connected to an external power source,
  determine whether the mobile computing device is connected to a local wireless network,
  determine whether the mobile computing device is in an inactive state,
  upon receiving an indication that new updated subscribed content is available, access the new updated subscribed content based on the stored user selection when the power supply of the mobile computing device is connected to the external power source, the mobile computing device is connected to the local wireless network, and the mobile computing device is in the inactive state, and
  delay access of the subscribed content when the power supply of the mobile computing device is not connected to the external power source, the mobile computing device is not connected to the local wireless network, and the mobile computing device is not in the inactive state.

20. The mobile computing device of claim 19, further comprising a memory port to receive the removable memory card comprising the memory.

21. The mobile computing device of claim 20, the availability of the memory comprising whether the removable memory card is present in the memory port.

22. The mobile computing device of claim 10, when the predetermined amount of memory is not free, the option presented to the user comprising an option to stream the content.

23. The mobile computing device of claim 19, the option is one of a set of options for accessing the subscribed content, the processing circuit to present a stream option and a download option if the memory is available.

24. The mobile computing device of claim 23, the set of options does not comprise a download option if the memory is not available.

25. The mobile computing device of claim 19, the option for accessing the subscribed content comprising a subscribe option.

26. The mobile computing device of claim 19, the subscribed content comprising a podcast or other enclosed file format in the feed.

* * * * *